US009411902B2

(12) United States Patent
Rajabi et al.

(10) Patent No.: US 9,411,902 B2
(45) Date of Patent: *Aug. 9, 2016

(54) RETRIEVING CONTENT FROM WEBSITE THROUGH SANDBOX

(71) Applicant: Microsoft Technology Licensing, LLC, Redmond, WA (US)

(72) Inventors: Zeyad Rajabi, Bellevue, WA (US); Taylor Hopper, Seattle, WA (US); Oliver Zheng, Bellevue, WA (US); Matthew Wood, Seattle, WA (US); Patrick Conlan, Seattle, WA (US); Robert Gavrila, Redmond, WA (US); Eric Broberg, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/983,618

(22) Filed: Dec. 30, 2015

(65) Prior Publication Data

US 2016/0110470 A1    Apr. 21, 2016

Related U.S. Application Data

(63) Continuation of application No. 13/458,126, filed on Apr. 27, 2012.

(51) Int. Cl.
*G06F 17/00* (2006.01)
*G06F 17/30* (2006.01)
*H04L 29/08* (2006.01)

(52) U.S. Cl.
CPC .... *G06F 17/30893* (2013.01); *G06F 17/30887* (2013.01); *H04L 67/02* (2013.01)

(58) Field of Classification Search
None
See application file for complete search history.

(56) References Cited

U.S. PATENT DOCUMENTS

| 5,983,348 | A | 11/1999 | Ji |
| 6,732,102 | B1 | 5/2004 | Khandekar |
| 7,912,924 | B1 * | 3/2011 | Cantrell ............ G06F 17/30569 709/219 |
| 8,626,802 | B2 | 1/2014 | Jalon et al. |
| 2002/0059166 | A1 | 5/2002 | Wang et al. |
| 2003/0090295 | A1 | 5/2003 | Andersen et al. |
| 2004/0139334 | A1 | 7/2004 | Wiseman |
| 2006/0116994 | A1 | 6/2006 | Jonker et al. |

(Continued)

OTHER PUBLICATIONS

"Non-Final Office Action Issued in U.S. Appl. No. 13/458,126", Mailed Date: Apr. 16, 2015, 12 Pages.

(Continued)

*Primary Examiner* — Natisha Cox
(74) *Attorney, Agent, or Firm* — Jessica Meyers; Jim Ross; Micky Minhas

(57) ABSTRACT

A client system interacts with a sandbox environment to host a web browser control within the sandbox. A webpage URL, a URL to a script file to be injected into the webpage, a name of the script method to be invoked, and the event to look for to trigger the script method sent to the sandbox environment from the client. The sandbox environment downloads the script file from the cloud using the script URL and loads a rendering engine with the specified webpage URL. The specified script file is subsequently injected into the loaded webpage at the sandbox environment. After the specified event is fired, the sandbox environment triggers the specified script method and stores the results within a results array, accessible to the client system.

20 Claims, 7 Drawing Sheets

(56) References Cited

U.S. PATENT DOCUMENTS

| | | | |
|---|---|---|---|
| 2007/0016949 A1* | 1/2007 | Dunagan | G06F 21/51 726/22 |
| 2007/0033532 A1 | 2/2007 | Lemelson | |
| 2008/0313648 A1 | 12/2008 | Wang et al. | |
| 2009/0158140 A1* | 6/2009 | Bauchot | G06Q 30/02 715/234 |
| 2009/0319747 A1 | 12/2009 | Jibbe et al. | |
| 2010/0017880 A1 | 1/2010 | Masood | |
| 2010/0192224 A1* | 7/2010 | Ferri | G06F 21/53 726/23 |
| 2011/0016169 A1* | 1/2011 | Cahill | G06F 17/3089 709/203 |
| 2011/0179362 A1* | 7/2011 | Craddock | H04L 51/08 715/752 |
| 2011/0219448 A1* | 9/2011 | Sreedharan | G06F 21/00 726/23 |
| 2011/0252302 A1 | 10/2011 | Yalovsky | |
| 2011/0307951 A1 | 12/2011 | Yermakov et al. | |
| 2012/0271960 A1* | 10/2012 | Geetha | G06F 9/4843 709/229 |
| 2012/0290945 A1* | 11/2012 | Byrne | G06Q 10/10 715/752 |

OTHER PUBLICATIONS

"Notice of Allowance Issued in U.S. Appl. No. 13/458,126", Mailed Date: Oct. 2, 2015, 9 Pages.

Cheyer, et al., "A Collaborative Programming Environment for Web Interoperability", In Proceedings of 3rd European Semantic Web Conference, Jun. 12, 2006, 15 Pages.

"International Search Report and Written Opinion Issued in PCT Application No. PCT/US2013/038304", Mailed Date: Jul. 15, 2013, 8 Pages.

* cited by examiner

RETRIEVING CONTENT FROM WEBSITE THROUGH SANDBOX

CROSS-REFERENCE TO RELATED APPLICATION

This application is a continuation under 35 U.S.C. §120 of U.S. patent application Ser. No. 13/458,126 filed on Apr. 27, 2012. The disclosure of the U.S. patent application is hereby incorporated by reference in its entirety.

BACKGROUND

Web applications provide a wide variety of services and data to users over networks. Data is collected, processed, and stored in different locations. Web applications retrieve that data, format it for presentation, and provide it to browsing applications on client devices for rendering websites. Some websites may be static, where the data is non-interactive. Others may provide some interactivity such as additional information through links or activation of web-based modules. In general, however, websites present data in a format and amount that is system generated according to organizational requirements or custom build based on user input and formatting.

Website content comes in variety of forms. Content may include text, audio, video, images, drawings, charts, etc. Validity and reliability of content in many websites may be suspect. In addition, there is a valid danger of malicious code embedded within content. Modern solutions meet demand for website content interaction by attempting to provide safe parsed content to end users. Parsed content solutions include client and server systems. Many need significant updates to preserve synchronicity with, technologies utilized in website construction. However, most parsing solutions fail upon facing frequent website updates. Dynamic nature of some websites make it a near impossibility to have a safe parser solution with high success rate for parsing content from websites. Additionally, customization to suit the variability of websites may also lead to problems in maintaining and hosting database solutions to parse content from websites.

SUMMARY

This summary is provided to introduce a selection of concepts in a simplified ions that are further described below in the Detailed Description. This summary is not intended to exclusively identify key features or essential features of the claimed subject matter, nor is it intended as an aid in determining die scope of the claimed subject matter.

Embodiments are directed to retrieving content from a website through a sandbox. A client system may interact with a sandbox environment to host a web browser control within the sandbox. A webpage URL, a URL to a script file to be injected into the webpage, a name of the script method to be invoked, and the event to look for to trigger the script method may be received at the sandbox environment from the client. The sandbox environment may download the script file from the cloud using the script URL and load a rendering engine with the specified webpage URL. The specified script file may be injected into the loaded webpage at the sandbox environment. After the specified event is fired, the sandbox environment may trigger the specified script method and store the results, within a results array, which may be made accessible to the client system.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
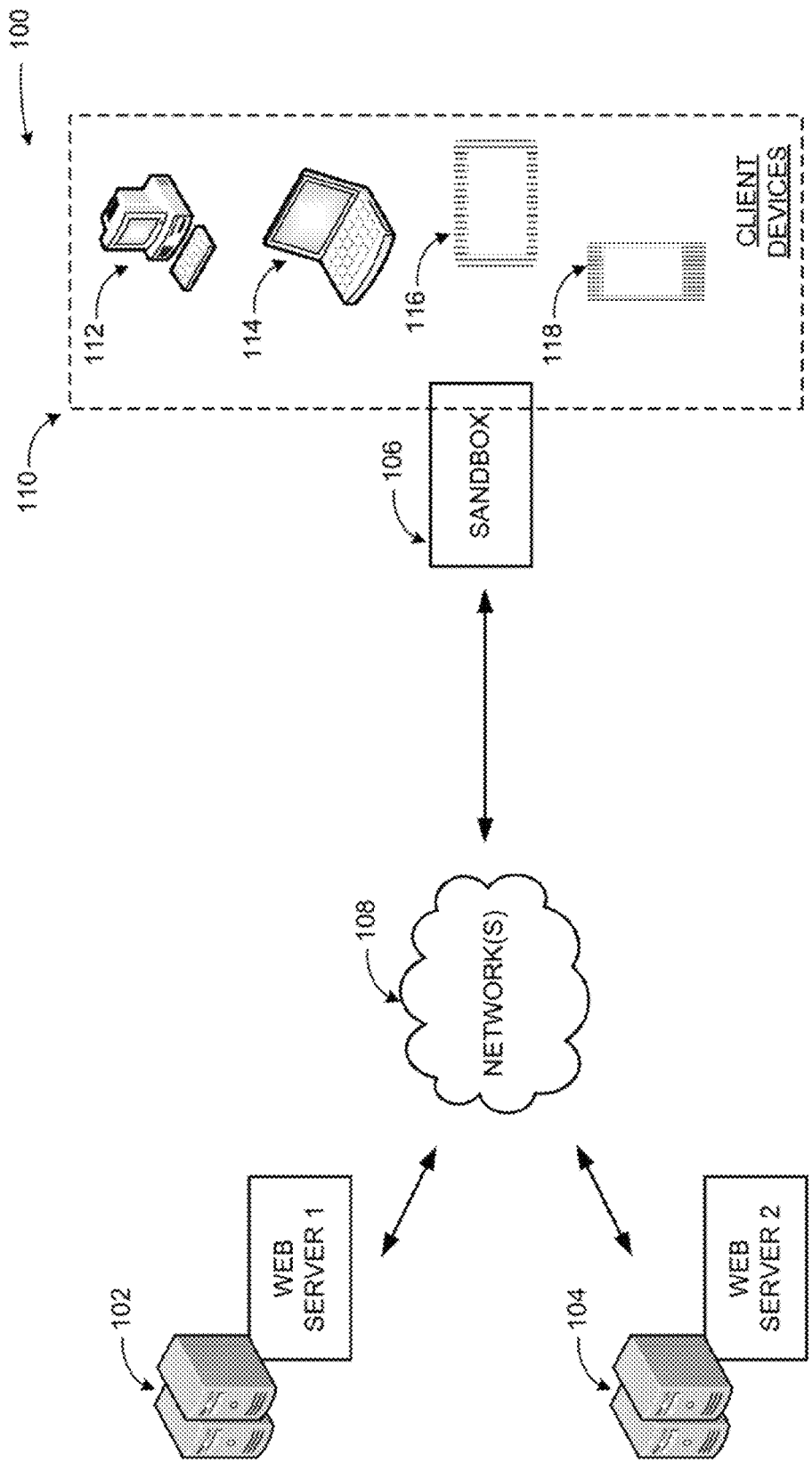
FIG. 1 illustrates an example network diagram where an application may retrieve content from a website through a sandbox according to some embodiments.

As briefly described above, an application may retrieve content from a website through a sandbox. The application may isolate extraction and preparation of content within the sandbox by using a script retrieved from a cloud source. The client may further be isolated from script management through an update mechanism at the cloud source.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described is the general context of program modules that execute in conjunction with an application program that runs on an operating system on a computing device, those skilled hi the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a sandbox may be a protected environment shielding external applications and devices from processed content within. A script may be a set of instructions to accomplish multiple-actions upon executions. A cloud source may be any network connected application/device providing a service as a unified entity.

Throughout this specification, the term "platform" may be a combination of software and hardware components for retrieving content from a website through a sandbox. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates an example network diagram, where an application may retrieve content from a website through a sandbox according to some embodiments. The components and environments shown in diagram 100 are for illustration purposes. Embodiments may be implemented in various local, networked, cloud-based and similar computing environments employing a variety of computing devices and systems, hardware and software.

In an example environment illustrated in diagram 100, one or more servers 102 and 104 may provide websites for consumption. Websites may host formatted text, and media such as audio, video, images, charts, drawings, tables, etc. The websites may be formatted in a standard format such a hypertext markup language (HTML). A sandbox environment 106 within a client application may process websites from, web server 1 (102) and web server 2 (104) to provide content associated with the websites to the client application on client devices 110 upon request through networks 108. The network(s) 108 may be any network architecture providing access to the sandbox environment 106 through wired or wireless technology.

Client devices 110 may include a variety of hardware such as desktop computer 112, laptop computer 114, a tablet device 116 such as a slate, and a smart phone 118. The client devices 110 may request content from websites through the sandbox environment 106. The content may include components of the website such as images, text components, media, or combinations. By employing the sandbox environment 106, client devices 110 may be protected against malware that may be embedded in a webpage. Through a predefined communication protocol, the client devices lit) may be enabled to communicate with the sandbox environment 106 enabling them to inject a cloud-based script within the sandbox environment 106 in response to a trigger event and retrieve results of the executed script outside the sandbox environment. By hosting the script in the cloud, extraction logic may be updated outside of the clients.

Figure 2:
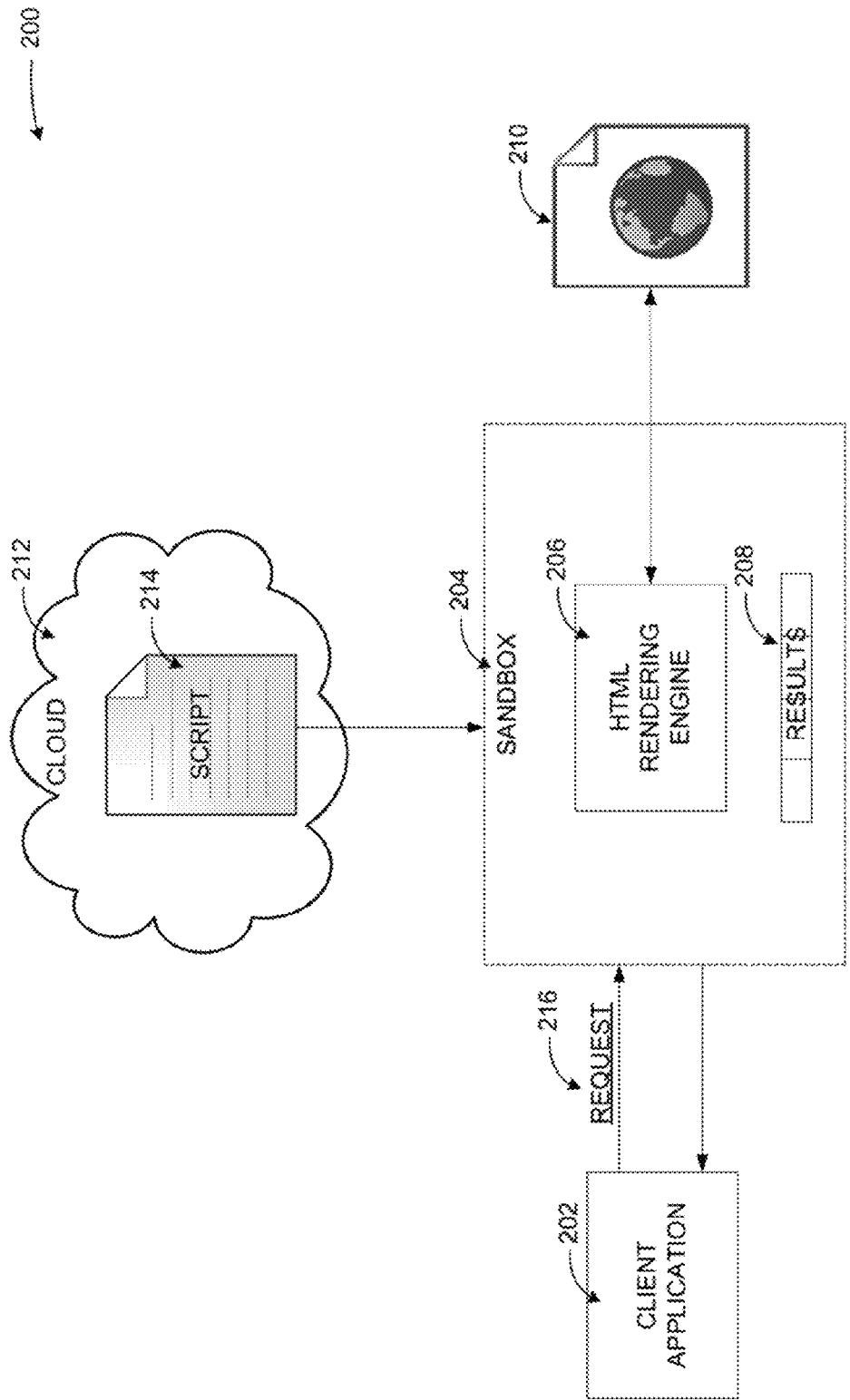
FIG. 2 illustrates a component diagram of an application retrieving content from a website through a sandbox according to embodiments.

FIG. 2 illustrates a component diagram of an application retrieving content from a website through a sandbox according to embodiments. Diagram 200 displays an example application hosting a sandbox 204 environment to process websites.

According to some embodiments, a client application 202 may transmit a request 216 an application hosting a sandbox 204 for content from a website. The request may include instructions about the website and how to retrieve the content. The application may retrieve the webpage content 210 and render it using a rendering engine (e.g., HTML rendering engine 206) within the sandbox 204. The application may also retrieve a script 214 from a cloud source 212 to extract the content. The application may inject the script 214 into the website content and execute the script method in response to a trigger event defined by the request 216 from the client application 202. The application may load the results of the execution of the script 214 onto a results array 208 provide to fee requesting client application 202. The results in the array may also be stored for future access.

According to other embodiments, the host application may isolate the loaded webpage within the sandbox. The processes related to rendering may be contained within the sandbox. Thus, the host application may isolate execution of the script and extraction of the content within the sandbox. In some implementations, the cloud-based script 214 may be used to extract content from a website and provide as part of a news feed or similar feed item. For example, a dominant image, title, content, an icon, or similar items may be extracted from a news website and provided as a teaser with a news feed or a search result associated with the website. The extracted items may be selected based on HTML properties, heuristics, or comparable methods. For example, image height, width, aspect ratio, vertical/horizontal position, etc. may be used to select an image from the web page. Similarly, icons, titles, or other elements of the webpage may be extracted in the sandbox 204.

According to yet other embodiments, the application may communicate with, the client application through a communication protocol. The communication protocol may be a standardized communication protocol such as hypertext transmission protocol (HTTP), encrypted communication such as secure http (HTTPS), or others.

According to further embodiments, the application may trigger a mechanism to inject the script into the loaded webpage within the sandbox according to a specified event. The client may provide the specified event through the initial request. The specified event may include a user defined event or a system defined event. Additionally, the mechanism to inject the script may include screening the loaded webpage and the content resulting from the injection for malware. In an example scenario, the client application may submit a request for content including only image data from a website. The application may render the webpage in the sandbox. The application may retrieve a script from the cloud source to extract image data from websites. And, the application may inject the script into the loaded webpage to extract the image data. The extracted image data may be loaded to an array for transmission to the client application.

According to other embodiments, the application may trigger a mechanism to transmit the content to the client outside of the sandbox. The application may load the content into the array according to infractions in the script. In an example scenario, the application may prepare the array according to a transmission protocol expected by the client application. Additionally, the application may receive instructions to customize the array according to the specifications of the client. In an example scenario, the application, may sort the array according to a sort architecture of the client application.

Figure 3:
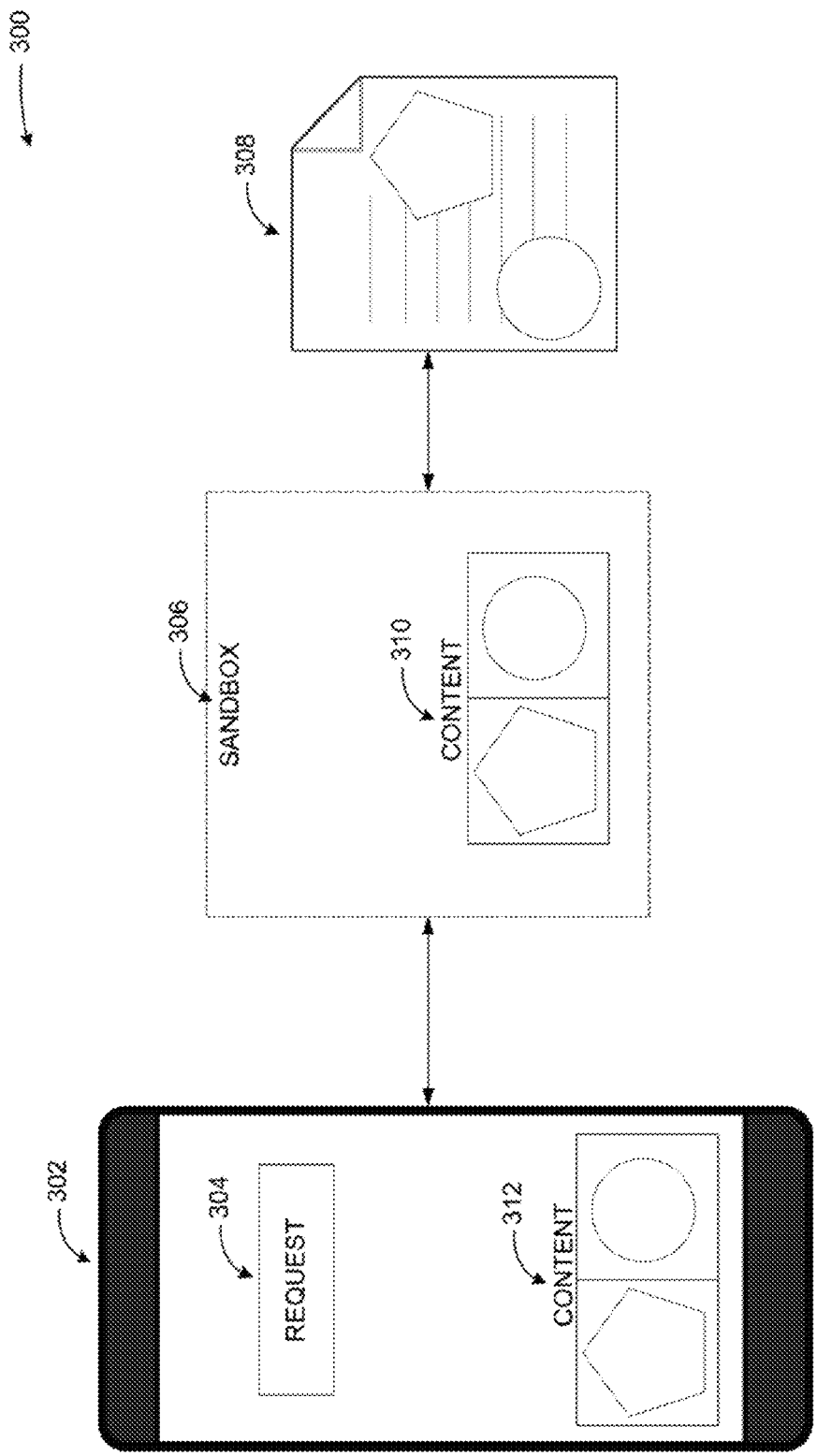
FIG. 3 illustrates an example extraction mechanism retrieving content from a website through a sandbox according to embodiments.

FIG. 3 illustrates an example extraction mechanism retrieving content from a website through a sandbox according to embodiments. Diagram 300 displays a mobile device such as a smart phone 302 requesting content from a website. An application hosting a sandbox environment 306 may render and extract content from the requested website.

According to some embodiments, a user of the smart phone 302 may initiate a request 304 for content from, a website by activating a touch control for the request 304. The application may receive the request 304 and retrieve a webpage 308 for rendering within sandbox environment 306. The application may process the webpage according to a script retrieved from a cloud source and load the extracted content 310 to an array. The extracted content may include individual components from the website such as images or other graphics, as well as textual content such as a title. The application may transmit the extracted content to the smart phone 302 and the smart phone may display the extracted content 312.

According to other embodiments, the application may retrieve the script from the cloud source providing an interlace to update the script. The cloud source may enable authorized external entities to update and refresh scripts. The scripts may be refreshed to optimize extraction to suit dynamic nature of websites. The application may also isolate the client from an update to the script. The application may alter behavior to alternately manage execution of script components unspecified by the request. The application may choose not to execute unspecified components of the script.

According to further embodiments, the application may render the webpage with an HTML rendering engine. The application may update components of the rendering engine dynamically to provide additional functionality such as support for other website construction languages and technologies. In addition, the application may execute a component, of the script matching a specified event, subsequent to detecting the specified event on the loaded webpage. An example may include, executing a component of the script calling for extraction of all audio content from the webpage upon detecting audio content within the webpage.

Figure 4:
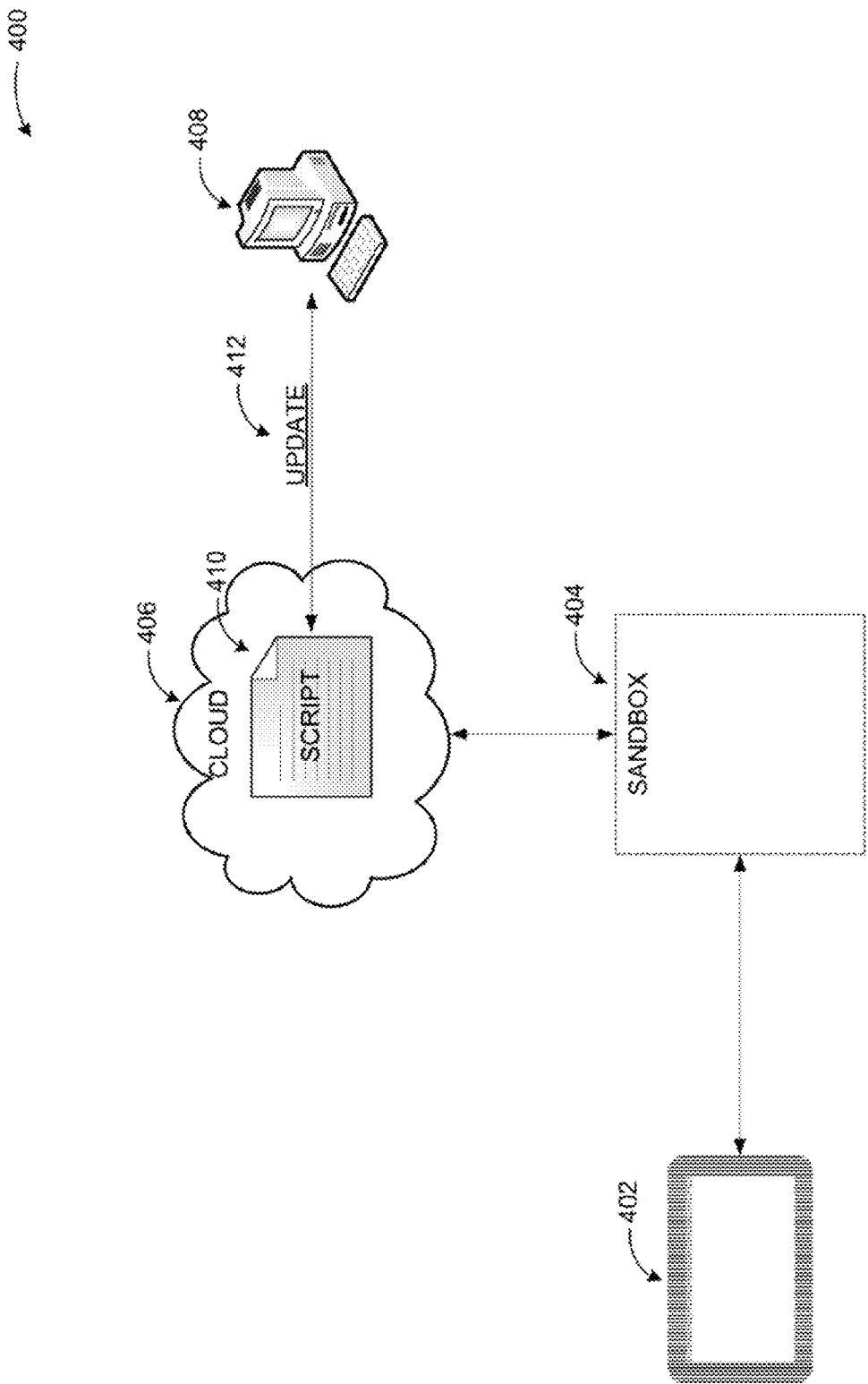
FIG. 4 illustrates an example update mechanism refreshing scripts to retrieve consent from a website through a sandbox according to embodiments.

FIG. 4 illustrates an example update mechanism refreshing scripts to retrieve content from a website through a sandbox according to embodiments. Diagram 400 may display art update mechanism to refresh scripts within a cloud source.

According to some embodiments, application hosting a sandbox 404 may process a website and extract content for client applications running on client devices such as tablet 402. The sandbox may retrieve a script 410 requested by the client from the cloud source 406. The cloud source may provide interfaces to update 412 and refresh the script 410. An authorized user may update (412) the script 410 through another client device such as an authorized desktop computer 408. The cloud source 406 may limit update access to organizational entities or limit update access through other access authorization schemes.

According to other embodiments, the application may detect the request that may include a uniform resource locator (URL) of the webpage, a URL of the script, a component of the script matching a specified event, and the specified event. Similar to the above example scenario, the specified event may be recognition of a certain content type of the webpage, such as video, and executing the component of the script to extract video from the webpage.

According to further embodiments, the application may store complex data structures in the elements of the array storing attributes of the content. In an example scenario, the application may employ a hash structure as a content array element. Additionally, the application may customize attributes of the content according to an executed component of the script. In an example scenario, the application may format attributes to accommodate bandwidth allocations of the client application and device. An example may include lowering image size and density of images from a website to fit mobile network bandwidth limits.

According to yet other embodiments, a user may request content from the sandbox through a touch enabled device such as a tablet, a smartphone, etc. The user may provide touch and gesture combinations to the display surface of the touch enabled device to send a request for content. The client application may receive the content array and format the content array to fit the display surface of the touch based device. The user may interact with the displayed content through touch and gesture input.

The example scenarios and schemas in FIG. 2 through 4 are shown with specific components, data types, and configurations. Embodiments are not limited to systems according to these example configurations. Retrieving content from, a website through a sandbox may be implemented in configurations employing fewer or additional components in applications and user interfaces. Furthermore, the example schema and components shown in FIG. 2 through 4 and their subcomponents may be implemented in a similar manner with other values using the principles described herein.

Figure 5:
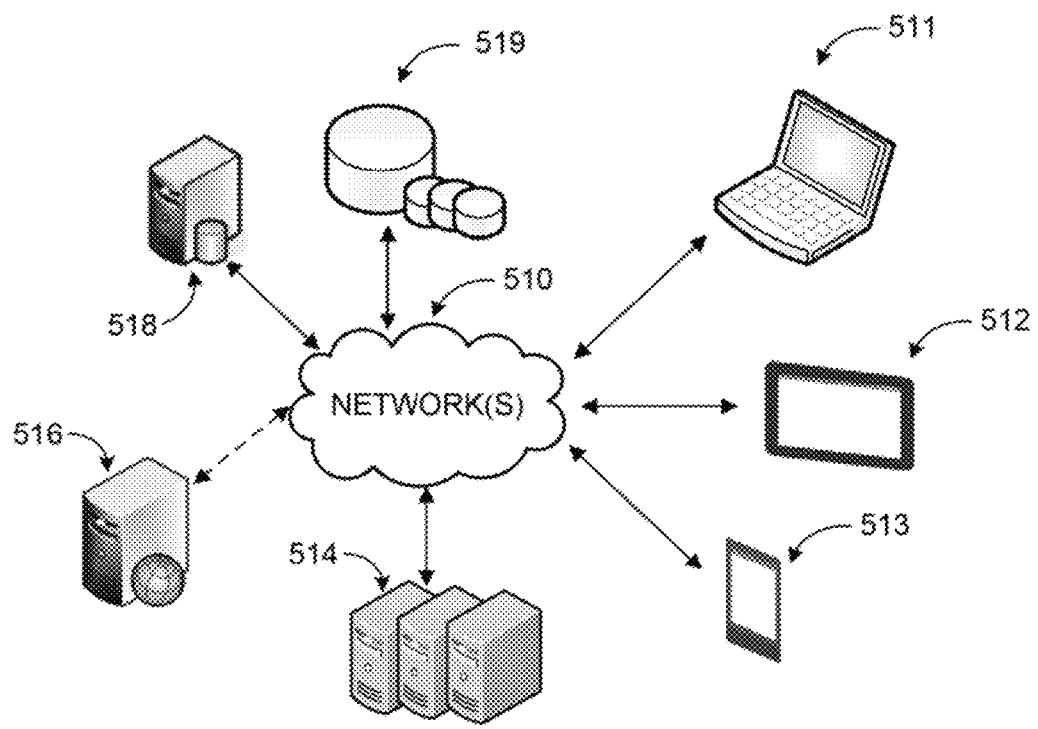
FIG. 5 is a networked environment, where a system according to embodiments may be implemented.

FIG. 5 is a networked environment, where a system according to embodiments may be implemented. Local and remote resources may be provided by one or more servers 514 or a single server (e.g. web server) 516 such as a hosted service. An application may communicate with client interfaces on individual computing devices such as a laptop 511, a tablet device 512 or a smart phone 513 ('client devices') through network(s) 510.

As discussed above, an application may retrieve content from a webpage through a sandbox. The application may isolate content extraction from the webpage by loading the webpage and injecting scripts into the webpage within the sandbox. The scripts may be provided and managed by cloud resources to update and refresh scripts for optimum webpage extractions. Client devices 511-513 may enable access to applications executed on remote server(s) (e.g. one of servers 514) as discussed previously. The servers) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to retrieve content from a website through a sandbox. Furthermore, the networked, environments discussed in FIG. 5 are for illustration purposes only. Embodiments are not limited to the example applications, modules, or processes.

Figure 6:
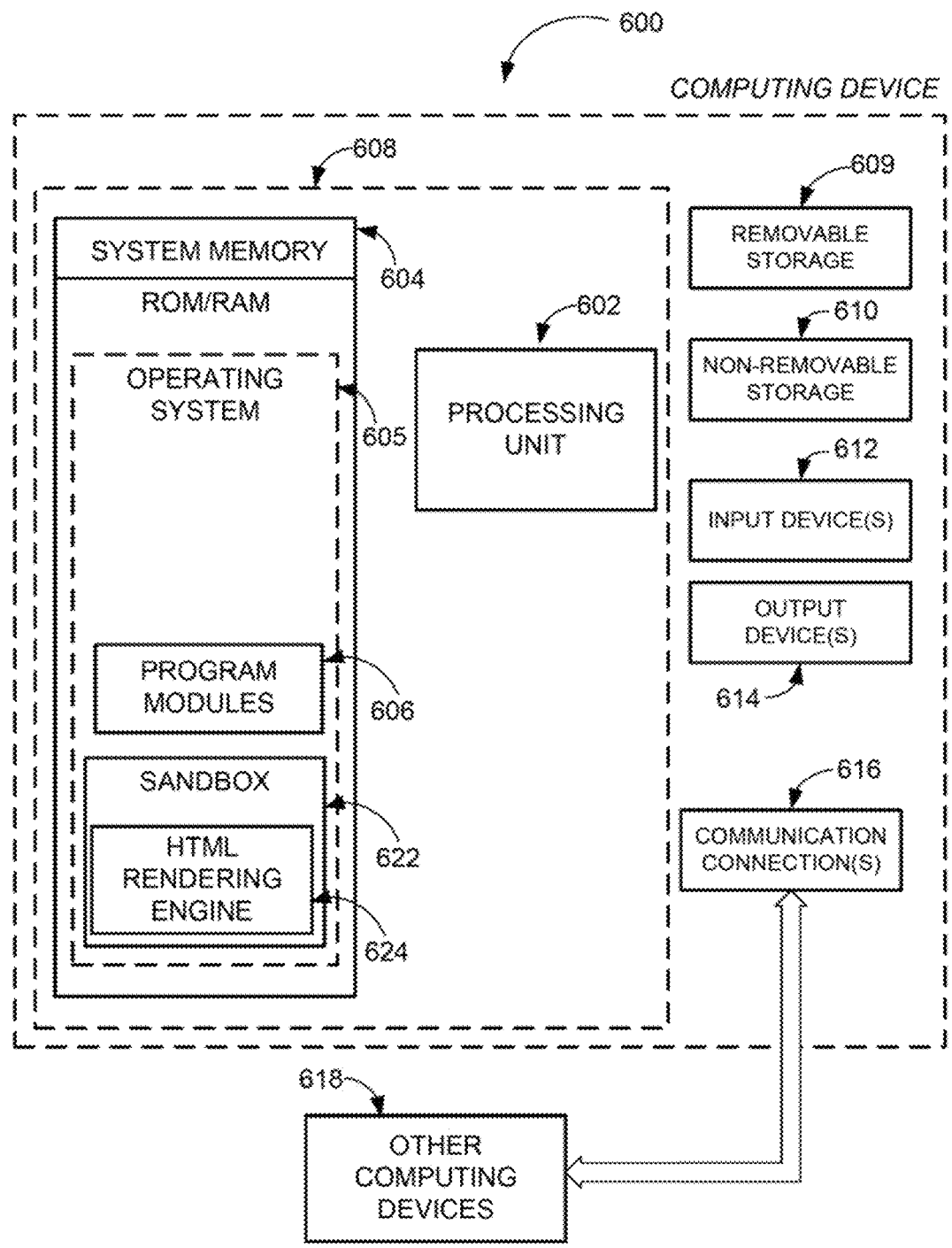
FIG. 6 is a block diagram of an example computing operating environment, where embodiments may be implemented.

FIG. 6 and the associated discussion are intended to provide a brief general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing anus that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, an application hosting a sandbox 622, and HTML rendering engine 624.

The application may isolate loading a website and script injection into the webpage through the sandbox 622 according to embodiments. The HTML rendering engine 624 may render the webpage and format the webpage according to technologies used to construct the webpage. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data, in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human, operators performing some. These human operators need not be co-located with each other, but each can be only with a machine that performs a portion of the program.

Figure 7:
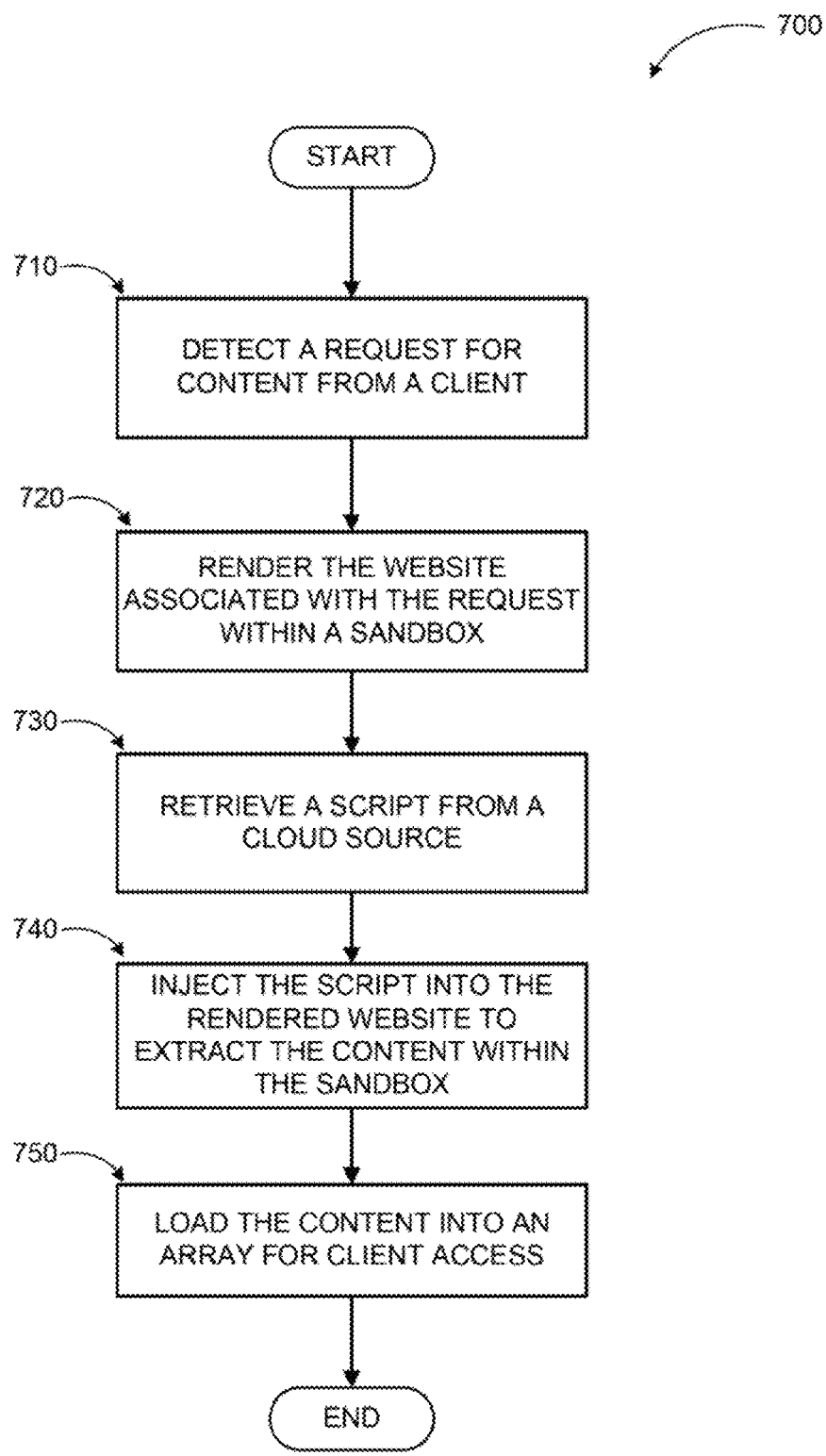
FIG. 7 illustrates a logic flow diagram for a process retrieving content from a website through a sandbox according to embodiments.

FIG. 7 illustrates a logic flow diagram for a process retrieving content from a website through a sandbox according to embodiments. Process 700 may be implemented by an application acting as a sandbox or an application hosting a sandbox as part of its functionality in some examples.

Process 700 may begin with operation 710 where an application may detect a request for content from a client. The request may include webpage and script addresses along with a specific event and a component of the script associated with the event. At operation 720, the application may load the webpage associated with the request within the sandbox. The application may isolate the loading/rendering operations through use of the sandbox. Next, the application may retrieve a script from a cloud source at operation 730. The application may inject the script into tire loaded webpage to extract the content within the sandbox at operation 740. The content may include text portions, audio, video, images, etc. Subsequently, the application may load the content into an array for client access at operation 750. The extracted content may be a thumbnail of the webpage.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Retrieving content from a website through a sandbox according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for retrieving content from a website through a sandbox, the method comprising:
   detecting a request for the content from a client, wherein the request includes a Uniform Resource Locator (URL) for a webpage, a URL for a script, a name of a script method to be executed, and a system defined trigger event;
   loading the webpage associated with the request within the sandbox;
   retrieving the script from a cloud source;
   triggering a mechanism to inject the script into the loaded webpage to extract the content within the sandbox according to the system defined trigger event; and
   executing the script method in response to detecting the system defined trigger event.

2. The method of claim 1, wherein the mechanism to inject the script includes screening the loaded webpage and the extracted content for malware.

3. The method of claim 1, further comprising:
   injecting the script into the loaded webpage to extract the content within the sandbox.

4. The method of claim 1, further composing:
   isolating the loaded webpage within the sandbox.

5. The method of claim 1, further comprising:
   isolating execution of the script method and extraction of the content within the sandbox.

6. The method of claim 1, wherein the extracted content includes at least one from a set of: an image, an icon, a textual content, and a graphic content.

7. The method of claim 6, wherein the textual content includes one or more of a title, a header, and a body text.

8. The method of claim 1, further comprising:
   triggering a mechanism to transmit the content to the client outside of the sandbox.

9. The method of claim 1, further comprising:
   loading results of the script execution into a results array for a client access.

10. The method of claim 9, further comprising:
    loading the content into the results array according to instructions in the script; and
    customizing the array according to specifications of the client.

11. The method of claim 1, further comprising:
    employing one of hypertext transmission protocol (HTTP) and secure http (HTTPS) for communicating with the client.

12. A computing device for retrieving content from a website through a sandbox, the computing device comprising:
    a memory configured to store instructions; and
    a processor coupled to the memory, the processor executing an sandbox hosting application in conjunction with the instructions stored in the memory, wherein the sandbox hosting application is configured to:
        detect a request for the content from a client, wherein the request includes a Uniform Resource Locator (URL) for a webpage, a URL for a script, a name of a script method to be executed, and a system defined trigger event;
        load the webpage associated with the request within the sandbox;
        retrieve the script from a cloud source;
        trigger a mechanism to inject the script into the loaded webpage to extract the content within the sandbox according to the system defined trigger event;
        execute the script method in response to detecting the system defined trigger event; and
        isolate the loaded webpage within the sandbox.

13. The computing device of claim 12, wherein the sandbox hosting application is further configured to:
    execute a component of the script matching a specified event subsequent to detecting the system defined trigger event on the loaded webpage; and
    provide the extracted content to the client for display in conjunction with one of a feed and a preview, wherein the extracted content is representative of the loaded webpage.

14. The computing device of claim 12, wherein the sandbox hosting application is further configured to:
    render the loaded webpage with a hypertext markup language (HTML) rendering engine within the sandbox, wherein one or more components of the HTML rendering engine are updated dynamically.

15. The computing device of claim 12, wherein the sandbox hosting application is further configured to:
    retrieve the script from the cloud source through an interface that enables one or more of updating and refreshing of the script.

16. The computing device of claim 12, wherein the sandbox hosting application is further configured to:
    update extraction logic within the sandbox outside of the client.

17. The computer-readable memory device with instructions stored thereon for retrieving content from a website through a sandbox, the instructions comprising:
    detecting a request for the content from a client, wherein the request includes a Uniform Resource Locator (URL) for a webpage, a URL for a script, a name of a script method to be executed, and a system defined trigger event;
    loading the webpage associated with the request within the sandbox;
    retrieving the script from a cloud source;
    triggering a mechanism to inject the script into the loaded webpage to extract the content within the sandbox according to the system defined trigger event;
    executing tire script method in response to detecting the system defined trigger event; and
    isolating the loaded webpage within the sandbox.

18. The computer-readable memory device of claim 17, wherein the instructions further comprise:
    loading results of the script execution into a results array for an access by the client;
    loading the extracted content into the results array according to instructions in the script; and
    customizing the results array according to specifications of the client.

19. The computer-readable memory device of claim 17, wherein instructions further comprise;
    isolating execution of the script method and extraction of the content within the sandbox.

20. The computer-readable memory device of claim 17, wherein the extracted content is a thumbnail of the loaded webpage.

* * * * *